UNITED STATES PATENT OFFICE.

CARLETON ELLIS, OF MONTCLAIR, NEW JERSEY.

UNSINTERED-METAL-POWDER CATALYZER AND PROCESS OF MAKING SAME.

1,185,075. Specification of Letters Patent. Patented May 30, 1916.

No Drawing. Application filed July 13, 1915. Serial No. 39,620.

*To all whom it may concern:*

Be it known that I, CARLETON ELLIS, a citizen of the United States, and a resident of Montclair, in the county of Essex and State of New Jersey, have invented certain new and useful Improvements in Unsintered-Metal-Powder Catalyzers and Processes of Making Same, of which the following is a specification.

This invention relates to catalyzers and to the process of making same and is concerned with catalytic material intended for use in hardening fatty oils by hydrogen addition and also for the hydrogenation of other bodies capable of taking up hydrogen by catalytic action and relates especially to base metal catalyzers such as nickel, cobalt, copper and the like preferably consisting solely of the metal in a finely-divided metallic state and substantially free from contraction due to sintering during the reduction operation.

The present application contains matter disclosed, but not claimed, in Serial No. 718,228 filed Sept. 3, 1912 now Letters Patent No. 1,067,978 of July 22, 1913, Serial No. 732,943 filed Nov. 22, 1912, now Letters Patent No. 1,097,308 of May 19, 1914 and copending application Serial No. 808,461 filed Dec. 23, 1913, all relating largely to catalyzers or catalytic processes for hydrogenating fatty oils in a liquid state.

In the hydrogenation of fatty oils it is often desired to use fine metal powder (specifically nickel powder) as the catalytic agent and without employing any extending material of an inert, mineral or earthy character which is disadvantageous in several ways, but heretofore it has not been possible by heat reduction to produce nickel powder of a very high degree of catalytic efficiency because generally speaking it has been regarded as necessary to carry on the reduction of the nickeliferous material at such a high temperature that the particles of raw material as they undergo reduction shrink and densify and thus the sensitiveness of the catalyzer is more or less impaired due to reduction in superficial contact area and probably to loss in porosity due to such densification. This loss of sensitiveness resulting from such sintering or fritting is overcome according to the present invention by reducing under such conditions as to preclude the occurrence of any undesirable contraction of this character, thereby forming a catalyzer possessing a very high measure of catalytic sensitiveness.

While it is possible to reduce palladium or platinum and similar rare metals entirely to the metallic state in various ways without that contraction of the particles which tends to produce an undesirably dense product this has not been the case with the base (non-noble) catalytic metals such as nickel, which can be fully reduced normally only at temperatures causing contraction in greater or less degree.

The invention will be illustrated and typified by nickel as the catalytic material although it should be understood that other catalytic base metals as stated may be employed and also if desired the rare metals of a catalytic nature in admixture with such base metals. Also catalyzers of two or more base metals may be prepared in accordance with the invention. Furthermore the use of carriers or supporting material such as inert mineral matter in a finely-divided condition in accordance with that procedure described below involving pressure is not precluded.

To make a nickel catalyzer of the properties aforesaid a suitable reducible nickel salt or compound preferably an oxidized body or basic compound such as the carbonate, hydrate or oxid is prepared in the proper finely-divided condition in any suitable manner but preferably by precipitation. For example, nickel nitrate is precipitated with ammonia and dried with some of the ammonium nitrate formed by the reaction present in the precipitate. When dry the product is well washed and finely-divided nickel hydrate material in a substantially uncontracted form is obtained in the precipitated form. This may then be reduced with hydrogen under normal atmospheric pressure at the temperature of say 200°–300° C., until a substantial part (but not all) of the oxygen is removed. The partially reduced product is then subjected to hydrogen under a pressure above atmospheric and preferably at about four or five atmospheres while maintaining the temperature at approximately the same point or roughly between 200 and 300° C., according to other conditions. By the application of the hydrogen under pressure, reduction takes place readily and effectively to form a product consisting almost solely of finely-divided metallic nickel, without running up the temperature to a point where catalytic sensitiveness is lost by contraction of the particles as a result of sintering or fritting or some similar change due to excessive temperatures at some stage of the operation. Thus by exposure of the material to an effective reducing atmosphere especially under conditions of dry reduction, that is, bathing the nickel material in a reducing atmosphere without the presence of any oily or similar vehicle the nickel powder may be obtained even at temperatures around 200° or 225° C. The term "dry reduction" is used to express this procedure, while the expression "wet reduction" is used to apply to methods of reducing catalyzer in an oily vehicle or other suitable medium. The catalyzer may be formed by wet reduction by employing the hydrogen under pressure preferably at about four to five atmospheres as indicated and at a temperature so low as not to injure fatty oils, when these are used as the medium or liquid vehicle. In either case the pressure may be varied substantially from the foregoing figures to accomplish the desired reduction of material more or less resistant according to circumstances.

Instead of carrying out a two stage reduction with hydrogen first under normal atmospheric pressure and then under materially higher pressure, the reduction may be carried out wholly with hydrogen under several atmospheres pressure.

The catalytic material in its raw state should be essentially or substantially free from catalyzer poisons such as sulfur, chlorin and the like unless the operation of reduction is carried out under conditions or with materials which tend to eliminate those bodies which are specific poisons for the material in hand.

The hydrogen preferably should be practically entirely freed from moisture when it is desired to produce a completely reduced metallic powder as water acts as an oxidizing agent and tends to produce some nickel oxid which may be undesirable for treating some oils.

A catalyzer powder produced as above is ordinarily strongly pyrophoric and may be preserved in oil or in an atmosphere of hydrogen prior to use. Of course, when reduction takes place in an oily vehicle, the resulting catalyzer is, when produced sealed from the air.

The reduction of the oxidized compound or similar metalliferous material may be carried out with hydrogen under pressure under regulated conditions at a relatively low temperature and in this manner nickel admixed with nickel oxid or suboxid or other partially oxidized metal powder may be obtained at temperatures substantially lower than heretofore employed.

The character of the catalyzer raw material is a matter of some consideration as regards ease of reduction. The hydrated oxid of nickel is more easily reduced than the oxid derived from the calcination of nickel nitrate. Adjustment of the pressure should be made with respect to the nature of the raw material. When employing hydrogen under a pressure of six to fifteen atmospheres the reduction of the hydrated oxid of nickel may take place at 150–175° C.

During the reducing operation the hydrogen may be blown off from time to time to remove the water which is formed or the hydrogen under pressure may be passed as a current over a layer of the material and the latter may be agitated as described in Patent No. 1,084,202 of Jan. 13, 1914, or in any other suitable way or may be reduced by the continuous process described in Patent No. 1,078,541 of Nov. 11, 1913.

While the preferred embodiment of my invention involves the use of hydrogen under pressure to produce an effective reducing atmosphere to create the conditions imposed herein, it should be understood that such effective reducing atmosphere may be effected in other ways and that other reducing gases or reducing vapors may likewise be employed for the purpose herein set forth.

To recapitulate, my invention relates to a catalyzer specifically adapted for hydrogenating the unsaturated constituents of fatty oils which comprises a fine catalytic powder, preferably nickel or nickel bearing material in a condition of high catalytic sensitiveness substantially free from sintered particles and to the process of preparing such a catalyzer which comprises exposing or bathing a fine powder of reducible raw material preferably oxidized nickel material free from retentive catalyzer poisons and preferably substantially free from inert extending agents to or in an effective reducing atmosphere preferably of hydrogen gas at a pressure of severel atmospheres preferably free from moisture and at a temperature sufficient to reduce said powder to a substantial degree and preferably largely or entirely to the metallic state while maintaining the reducing temperature below the sintering or fritting point of the particles of the material under reduction so that the surface of contact of the reduced particles with respect to that of the raw material is preserved as much as possible and a metallic nickel powder of extensive surface contact area and of high catalytic sensitiveness is obtained.

What I claim is:—

1. A process of preparing a catalyzer adapted for hydrogenating fatty oils which comprises bathing a fine bulky unsintered powder consisting essentially of reducible catalyzer raw material in an effective reducing atmosphere consisting of a reducing gas, under a pressure materially above atmospheric, while at a temperature sufficient to reduce said powder substantially to the metallic state, but low enough to prevent any considerable amount of shrinking and densifying of the particles of said material, whereby the surface of contact of the reduced particles with respect to that of the raw material is substantially largely preserved and a metallic powder of extensive surface contact area and of high catalytic sensitiveness is obtained, and thereafter maintaining the product of said treatment out of contact with oxidizing influences until used.

2. The process of preparing a catalyzer adapted for hydrogenating fatty oils which comprises bathing a fine bulky powder of an oxidized nickel material in an effective reducing atmosphere consisting of a reducing gas under a pressure materially above atmospheric, while at a temperature sufficient to reduce said powder substantially to the metallic state but low enough to prevent any considerable amount of shrinking and densifying of the particles of said material, whereby the surface of contact of the reduced particles with respect to that of the raw material is substantially largely preserved and a metallic nickel powder of extensive surface contact area and of a high catalytic sensitiveness is obtained, and thereafter maintaining the product of said treatment out of contact with oxidizing influences until used.

3. A catalyzer specifically adapted for hydrogenating oils which comprises reduced nickel, in a bulky, unsintered condition, retained in a protective non-oxidizing environment.

4. A product comprising bulky, unsintered, substantially pure metallic nickel powder, sealed in oil.

5. A catalyzer specifically adapted for hydrogenating oils, which comprises reduced metal, having the property of acting as a catalyst in the hydrogenation of organic bodies, the same existing in a bulky unsintered condition, and retained in a protective non-oxidizing environment.

6. In the production of catalyzers suitable for hydrogenation purposes, the step of reducing a solid, non-compacted, bulky, oxygen-containing compound of a metal having catalytic properties by subjecting the same to the action of a gas containing hydrogen at a temperature at which such gas will exercise a reducing action on said compound, but below the temperature at which said compound or the reduction product thereof would become materially densified, while said gas is under a pressure materially above atmospheric.

7. In the production of catalyzers suitable for hydrogenation purposes, the step which consists in reducing unidentified catalyzer raw material with a reducing gas under pressure, at a temperature below that at which any material amount of densification of the product would occur.

8. A process of preparing a catalyzer adapted for hydrogenating oils which comprises subjecting a bulky, unsintered powder composed essentially of a reducible compound of a catalytic metal to the action of a reducing atmosphere comprising hydrogen, at a temperature sufficient to reduce said compound to the metallic state, but low enough to prevent material shrinking and densifying of the product, and thereafter sealing said catalyzer in an appropriate non-oxidizing vehicle, until the same is to be employed.

9. A process of preparing a catalyzer which comprises subjecting a bulky, unsintered material containing oxidized nickel to the action of a reducing atmosphere, at a temperature sufficient to produce substantially complete reduction of said material, but at a temperature too low to sinter or densify said material, and sealing the nickel catalyst thereby produced, in a non-oxidizing vehicle, until the same is to be used.

10. In the production of nickel catalyzers, the step which consists in reducing a comparatively bulky precipitated nickel compound, by subjecting the same to the action of a reducing gas under pressure, at a temperature below that at which any material amount of densification of the product would occur.

CARLETON ELLIS.

It is hereby certified that in Letters Patent No. 1,185,075, granted May 30, 1916, upon the application of Carleton Ellis, of Montclair, New Jersey, for an improvement in "Unsintered-Metal-Powder Catalyzers and Processes of Making Same," an error appears in the printed specification requiring correction as follows: Page 3, line 73, claim 7, for the word "unidentified" read *undensified;* and that the said Letters Patent should be read with this correction therein that the same may conform to the record of the case in the Patent Office.

Signed and sealed this 13th day of February, A. D., 1917.

[SEAL.]

R. F. WHITEHEAD,
*Acting Commissioner of Patents.*

Cl. 23—28.